United States Patent
Breznak et al.

(10) Patent No.: US 7,405,379 B2
(45) Date of Patent: Jul. 29, 2008

(54) SYSTEM FOR APPLYING AN ISOLATION LAYER TO A BRAZED END OF A GENERATOR ARMATURE WINDING BAR

(75) Inventors: Jeffrey Michael Breznak, Waterford, NY (US); James Fredrick Hopeck, Mechanicsville, NY (US); Alan Michael Iversen, Clifton Park, NY (US); Lawrence Lee Sowers, Balston Lake, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/694,244

(22) Filed: Mar. 30, 2007

(65) Prior Publication Data

US 2007/0164016 A1 Jul. 19, 2007

Related U.S. Application Data

(62) Division of application No. 10/991,416, filed on Nov. 19, 2004, now Pat. No. 7,199,338.

(51) Int. Cl.
*B23K 13/01* (2006.01)
*B23K 1/00* (2006.01)

(52) U.S. Cl. .................... 219/615; 228/33
(58) Field of Classification Search ............. 219/615, 219/616, 617, 603, 600, 85.1; 228/33, 51
See application file for complete search history.

(56) References Cited

U.S. PATENT DOCUMENTS

| | | | |
|---|---|---|---|
| 2,455,560 A * | 12/1948 | Cobb et al. | 219/605 |
| 2,484,333 A * | 10/1949 | Cobb et al. | 219/615 |
| 2,557,745 A * | 6/1951 | Huntley et al. | 219/615 |
| 2,660,682 A * | 11/1953 | Clokey et al. | 310/234 |
| 2,791,667 A * | 5/1957 | Clark et al. | 219/615 |
| 3,693,036 A | 9/1972 | Schmitt | |
| 4,066,203 A | 1/1978 | Davies | |
| 4,199,700 A | 4/1980 | Daugherty et al. | |
| 4,380,362 A | 4/1983 | Swensrud et al. | |
| 4,385,254 A | 5/1983 | Vakser et al. | |
| 4,894,575 A | 1/1990 | Nilsson et al. | |
| 5,581,869 A | 12/1996 | Travaly | |
| 5,605,590 A | 2/1997 | Manning et al. | |
| 5,616,040 A | 4/1997 | Taillon et al. | |

(Continued)

FOREIGN PATENT DOCUMENTS

EP 0 899 448 3/1999

*Primary Examiner*—Daniel L Robinson
(74) *Attorney, Agent, or Firm*—Nixon & Vanderhye P.C.

(57) ABSTRACT

A method of forming a brazed joint between an armature bar and a hydraulic header clip including: assembling an end of the armature bar, hydraulic header clip and a substantially phosphorus-free braze material; positioning the assembly of the armature bar, hydraulic header clip and the braze material in a braze chamber, such that the clip is seated in an induction heating coil; heating the assembly to a first temperature within 200 degrees Fahrenheit of and below a solidus temperature of the braze material by applying electrical current to the induction heat coil; heating the assembly to a second temperature above the liquidus temperature of the braze material; pooling liquid braze material on ends of the armature bar, and cooling the assembly and thereby forming a braze layer on the end of the armature bar.

17 Claims, 8 Drawing Sheets

U.S. PATENT DOCUMENTS

| | | | |
|---|---|---|---|
| 5,717,267 A * | 2/1998 | Paroz | 310/54 |
| 5,760,371 A | 6/1998 | Dailey et al. | |
| 5,791,924 A * | 8/1998 | Taillon et al. | 439/191 |
| 5,796,189 A | 8/1998 | Manning et al. | |
| 5,809,632 A | 9/1998 | Champagne et al. | |
| 5,875,539 A * | 3/1999 | Kilpatrick et al. | 29/596 |
| 6,577,038 B2 | 6/2003 | Butman et al. | |
| 2002/0079773 A1 | 6/2002 | Butman et al. | |
| 2005/0247762 A1 | 11/2005 | Breznak et al. | |
| 2006/0108356 A1 | 5/2006 | Hopeck et al. | |
| 2006/0108401 A1 | 5/2006 | Breznak et al. | |

* cited by examiner

SYSTEM FOR APPLYING AN ISOLATION LAYER TO A BRAZED END OF A GENERATOR ARMATURE WINDING BAR

RELATED APPLICATIONS

This application is a divisional of application Ser. No. 10/991,416 (U.S. Pat. No. 7,199,338) filed Nov. 19, 2004.

BACKGROUND OF THE INVENTION

The present invention relates to brazing generator armature winding bars to hydraulic header clips, and to a method for sealing an armature winding bar to its header clips to prevent or reduce corrosion due to coolant water flowing through the end fitting and the armature winding bar.

The armature windings on large steam-turbine generators are generally water-cooled. The armature windings comprise an arrangement of half coils or armature bars (collectively referred to as "armature bars" or "bars") connected at each end through copper or stainless steel fittings and water-cooled connections to form continuous hydraulic winding circuits.

Water-cooled armature winding bars are comprised of a plurality of small rectangular solid and hollow copper strands arranged to form a bar. The rectangular copper strands are generally arranged in rectangular bundles. The hollow strands each have an internal duct for conducting coolant through the bar. The ends of the strands are each brazed to a respective hydraulic header clip. The hydraulic header clip serves as both an electrical and a cooling flow connection for the armature winding bar.

The hydraulic header clip is a hollow connector that includes an enclosed chamber for ingress or egress of a cooling liquid, typically deionized water. At one open end, the clip encloses the ends of the copper strands of the armature winding bar. A braze alloy bonds the end sections of the strands to each other and to the hydraulic header clip. The braze joints between adjacent strand ends and between the strand ends and the clip should retain hydraulic and electrical integrity for the expected lifetime of the winding. A typical life time of a winding is on the order of tens of years.

Internal surfaces of the brazed joints between the clip and the ends of the strands are constantly exposed to the deionized, oxygenated water flowing through the clip and the hollow strands. The exposure of the brazed surfaces to the coolant can result in corrosion of the armature winding bar and hydraulic header clip. Corrosion tends to occur in the crevices of the joints between the hydraulic header clip and the strand ends of the armature bar, and in the crevices between the strand ends. Corrosion of a phosphorus-containing braze alloy and adjoining copper strand surfaces can occur if critical crevice geometry and crevice water chemistry conditions are present. Certain conditions promote crevice corrosion in the braze joints, such as: phosphorus, copper, suitable corrosion initiation sites and water. If any one of these conditions is eliminated from the clip to bar joints, crevice corrosion should be reduced or eliminated.

The corrosion process can initiate if the braze joint surfaces contain surface crevices, pinholes, or porosity at or near the surface of the joint and the critical water chemistry conditions that support corrosion. The corrosion process can progress through the braze joints especially when critical crevice geometry and water chemistry conditions exist. Porosity within the braze joints can accelerate corrosion. If allowed to progress through a joint, corrosion will eventually result in a water leak through the entire effective braze joint length and compromise the hydraulic integrity of the clip-to-strand joint.

Accordingly, there is a long felt need for a corrosion-resistant clip-to-strand braze joint. The benefits of crevice corrosion-resistant braze joint are expected to include improved generator availability and generator reliability.

BRIEF DESCRIPTION OF THE INVENTION

A non-crevice-corroding clip-to-strand braze joint has been developed using a silver based braze alloy that is essentially phosphorus-free. A method to braze the joint and a brazing chamber assembly has also been developed. In preparation for brazing, strips of braze alloy are interleaved between tiered rows of the copper strands such that the strips extend beyond rows of short solid strands but not beyond the free ends of longer hollow strands. During induction heating, the braze alloy is briefly heated to above its liquidus temperature such that the alloy pools on the solid strand ends and in crevices between the strands and the internal surfaces of the hydraulic header clip. The pooled alloy when cooled forms a layer of braze alloy that isolates the solid strand ends, the joints between strand ends and the joints between strand ends and the clip from the coolant passage in the clip.

The brazing chamber includes a split hood that when closed and purged has an essentially oxygen free atmosphere. The armature bar is mounted vertically in the chamber such that the free ends of the copper strands are horizontal to allow liquid braze alloy to pool on the solid free ends. A cooled heat sink clamps the bar just below the hydraulic clip to chill the bar and solidify braze alloy flowing down between the strands. A hooked induction coil in the chamber heats the clip, strand ends and strips of braze alloy. A mechanical ram compresses the clip, strand ends and braze strips together during the brazing process in the chamber.

The invention may be embodied as a method of forming a brazed joint between an armature bar and a hydraulic header clip including: assembling an end of the armature bar, hydraulic header clip and a substantially phosphorus-free braze material; positioning the assembly of the armature bar, hydraulic header clip and the braze material in a braze chamber, such that the clip is seated in an induction heating coil; heating the assembly to a first temperature within 200 degrees Fahrenheit of and below a solidus temperature of the braze material by applying electrical current to the induction heat coil; heating the assembly to a second temperature above the liquidus temperature of the braze material; pooling liquid braze material on ends of the armature bar, and cooling the assembly and thereby forming a braze layer on the end of the armature bar.

The invention may be further embodied as a method of forming a brazed joint between an armature bar and a hydraulic header clip comprising: assembling free ends of hollow strands and of solid strands of the armature winding bar and positioning the assembly within the hydraulic header clip; interleaving a silver based braze alloy between the strands, wherein a portion of the braze alloy extends axially beyond the free ends of a plurality of the solid strands and the free ends of a plurality of the hollow strands extend axially beyond the braze material; positioning the assembly of the free ends, hydraulic header clip and the braze alloy in a braze chamber, such that the clip is seated in an induction heating coil of the chamber; heating the assembly to a first temperature below a solidus temperature of the braze alloy and within a 200 degrees Fahrenheit of the solidus temperature activating the induction heat coil to heat the clip; heating the assembly to a second temperature above the liquidus temperature of the braze alloy; pooling liquid braze alloy on ends of the armature bar, and cooling the assembly and clip thereby forming a braze isolation layer on the end of the armature bar.

The invention may also be embodied as a system for forming a brazed joint between an armature winding bar and a hydraulic header clip comprising: an assembly of free ends of hollow strands and solid strands of the armature winding bar positioned within the hydraulic header clip; a silver based braze alloy interleaved between the strands, wherein a portion of the braze alloy extends axially beyond the free ends of a plurality of the solid strands and the free ends of a plurality of the hollow strands extend axially beyond the braze material; said assembly of the free ends, hydraulic header clip and the braze alloy mounted a braze chamber, such that the clip is seated in an induction heating coil of the chamber, and a controller receiving a temperature feedback signal from a temperature sensor in the chamber and controlling a temperature in the chamber by controlling power applied to the coil and based on the feedback signal, wherein during a brazing period said coil heats the assembly to a temperature above the liquidus temperature of the braze alloy.

DETAILED DESCRIPTION OF THE INVENTION

Figure 1:
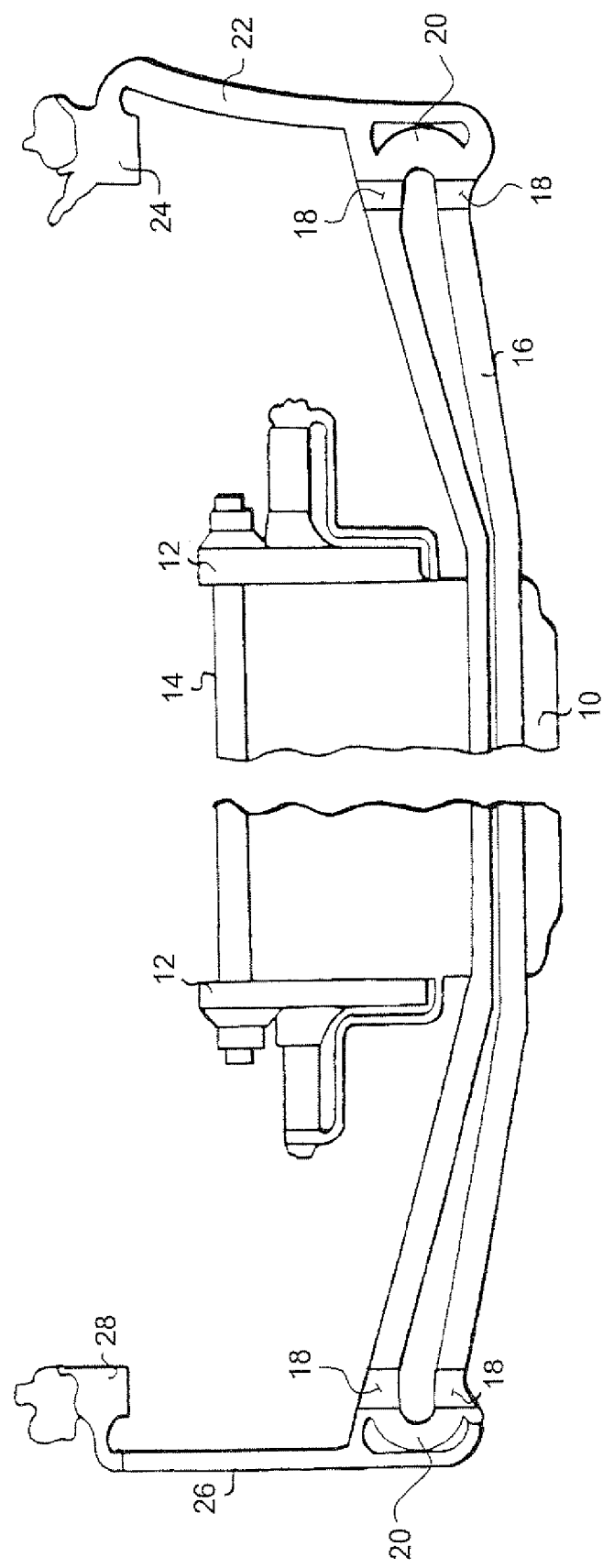
FIG. 1 is a schematic illustration of a liquid-cooled stator winding arrangement illustrating the armature bars and hydraulic header clips coupled to inlet and outlet coolant headers.

FIG. 1 illustrates a liquid-cooled armature winding arrangement for a stator in a typical liquid-cooled generator. A stator core 10 having stator core flanges 12 and core ribs 14. Armature winding bars 16 (also referred to as stator bars) pass through radially extending slots in the stator core and are capped at opposite ends by hydraulic header clips 18 fitted to the ends of the bars. Inlet hoses 22 connect an inlet clip 18 to an inlet coolant header 24. Outlet hoses 26 connect an outlet clip 18 to an outlet coolant header 28. A copper or stainless steel fittings 20 connect adjacent ends of pairs of armature bars and clips to form complete armature coil elements.

Figure 2:
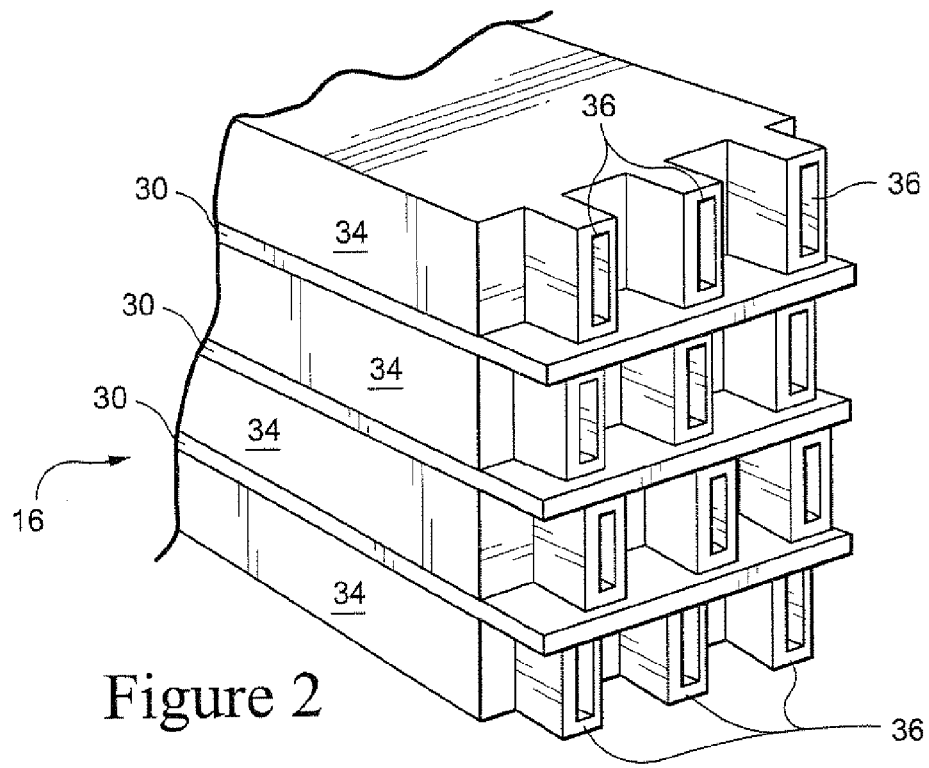
FIG. 2 is a perspective view of the end of an armature winding bar showing the tiered rows of hollow and solid strands, and interleaving sheets of braze material.
Figure 3:
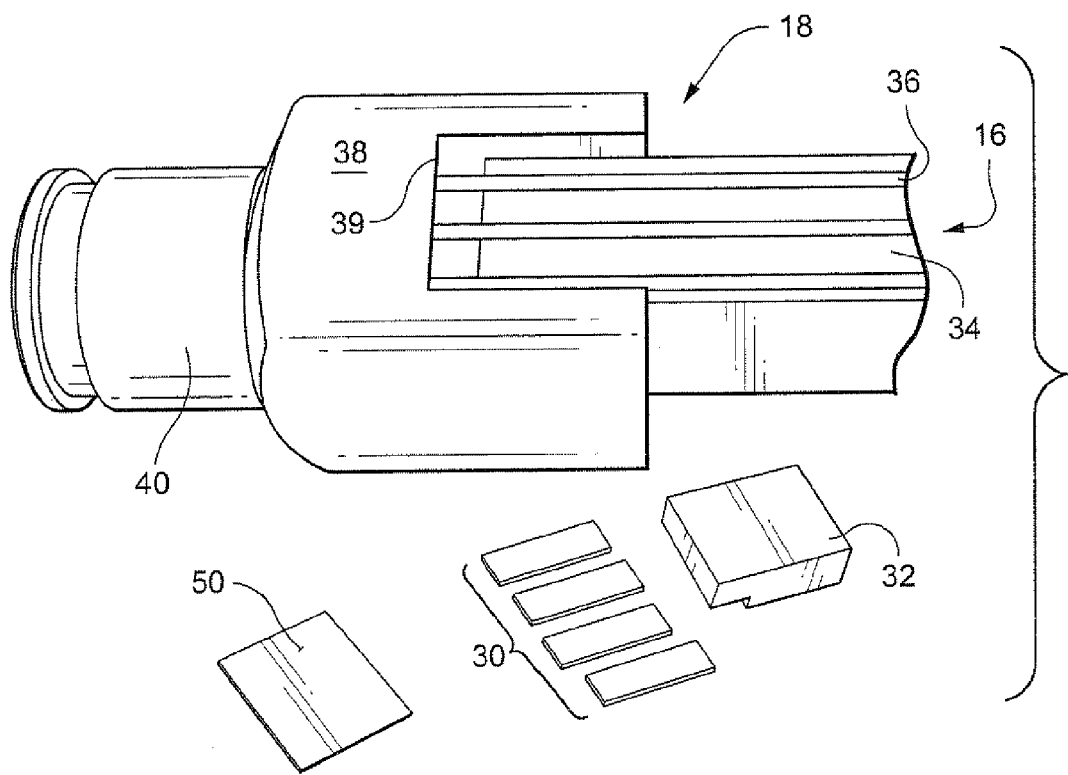
FIG. 3 is a perspective exploded view of the end of an armature winding bar inserted into a hydraulic header clip, with braze material and a clip cover shown to the side of the clip.

FIG. 2 is a perspective end view of an armature winding 16 bar without a hydraulic header clip. The bar is a rectangular array of solid 34 and hollow 36 copper strands. FIG. 3 is a perspective view of the armature winding bar 16 inserted in a clip 18 with braze strips 30 and a braze sheet 50 and a clip cover 32 shown to the side of the clip. In FIG. 2, the braze strips 30 are shown interleaved between tiered rows of solid the copper strands 34 and rows of hollow strands 36 of the bar 16.

Each armature winding bar 16 includes a plurality of solid copper strands 34 and hollow copper strands 36. The strands 34, 36 may also be constructed of metals other than copper, such as copper-nickel alloys or stainless steel. The ends of the strands 34, 36 form the end of the armature winding bar 16. The free ends of the hollow strands 36 (and optionally some of the ends of the solid strands) extend axially beyond the free ends of short solid strands 34. For example, the free ends of the hollow strands extend approximately 0.31 inch (10 to 500 mils) beyond the free ends of the solid strands.

In the armature winding bar 16 shown in FIGS. 2 and 3, the extended hollow strands 36 form tiered rows with respect to the shorter rows of solid strands 34. A four-tier array is shown in FIG. 2. It will be appreciated that various numbers of tiers are possible in an armature bar. The particular configuration of solid strands 34 and hollow strands 36 within the armature winding bar 16 is a matter of design choice. There may be a one to one ratio of solid to hollow strands or a ratio of 6 solid strands to one hollow strand. The ratio may be greater or smaller depending on the capability of the bar design to remove heat during generator operation.

Braze alloy strips 30 and sheets 50 of a rolled, essentially phosphorus-free, silver based braze alloy are placed between the tiers of strands and between the strands and the internal surfaces of the hydraulic header clip 18. The silver braze alloy of the strips 30 and sheets 50 may contain other elements, such as tin, zinc or nickel, that can result in solidus and liquidus modifications to suit specific applications. The thickness of the alloy strips 30 and sheets 50 is a matter of design choice. For example, the strip 30 thickness may be 0.060 inches and the sheet 50 thickness may be 0.020 inches.

The braze alloy has minimal phosphorus. The phosphorus-containing metallurgical phases of earlier braze alloys are susceptible to crevice corrosion. Braze alloys with less than 500 ppm (or 0.05 weight percent) phosphorus are considered phosphorus-free. The benefits of using a phosphorus free braze alloy include reduced corrosion and hence improved generator availability and reliability.

The pre-braze positioned braze alloy strips extend beyond the ends of the short solid strands. After brazing, the braze alloy forms a braze alloy isolation layer 52 over the end of the armature bar (but not the end of the hollow strands). The isolation layer shields the solid strand ends and the joints from the coolant passage in the clip. The braze alloy also bonds the clip to the strands and the strand ends to each other.

The strips 30 inserted between the tiers of strands may be rectangular as shown in FIG. 3. The braze strips are shaped to fit between the strand rows. The edges of the braze strips may be trimmed into alignment with the outer surfaces of the strands of the bar 16. Substantially square braze sheets 50 may be fitted between the sides of the armature winding bar and the internal sides of the header clip. The height of the alloy pre-positioned before brazing is selected so that the braze alloy will entirely melt during the braze process and not flow into the open ends of the extended hollow strands.

Figure 4:
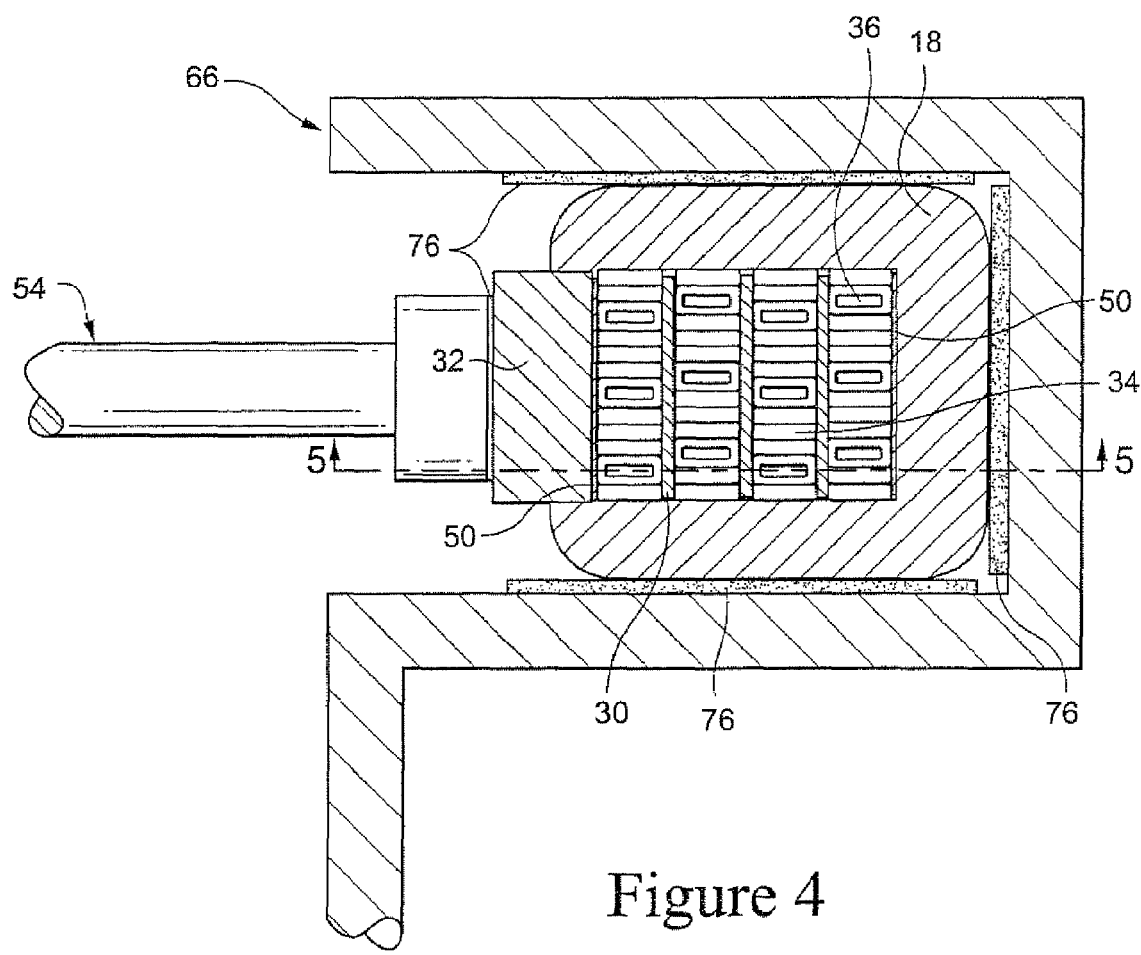
FIG. 4 is an end view of the strands of an armature winding bar within a hydraulic header end clip with a ram clamping the cover to the clip and a heat sink attached to the bar.

FIG. 4 is a cross-sectional end view of the hydraulic header clip 18, the free ends of the solid 34 and hollow 36 strands, a ram 54 pressing the clip cover 34 into the clip and an induction heating coil 66 to heat the assembly of the clip, strand and braze strips 30 and sheets 50. The hydraulic header clip 18 (also referred to as a stator bar clip) is formed of an electrically conductive material, such as copper. The clip 18 is hollow and includes a rectangular collar 38 that slides over the outer side surfaces of the end of the armature winding bar 16.

A rectangular slot 39 in the collar receives the end of the armature winding bar and interleaved strips 30 of the braze alloy. The clip cover 32 fits into the matching rectangular slot 39 in the side of the collar 38. At the other end of the clip 18 is a cylindrical coupling end 40 that is configured to connect to the coolant circuit.

Figure 5:
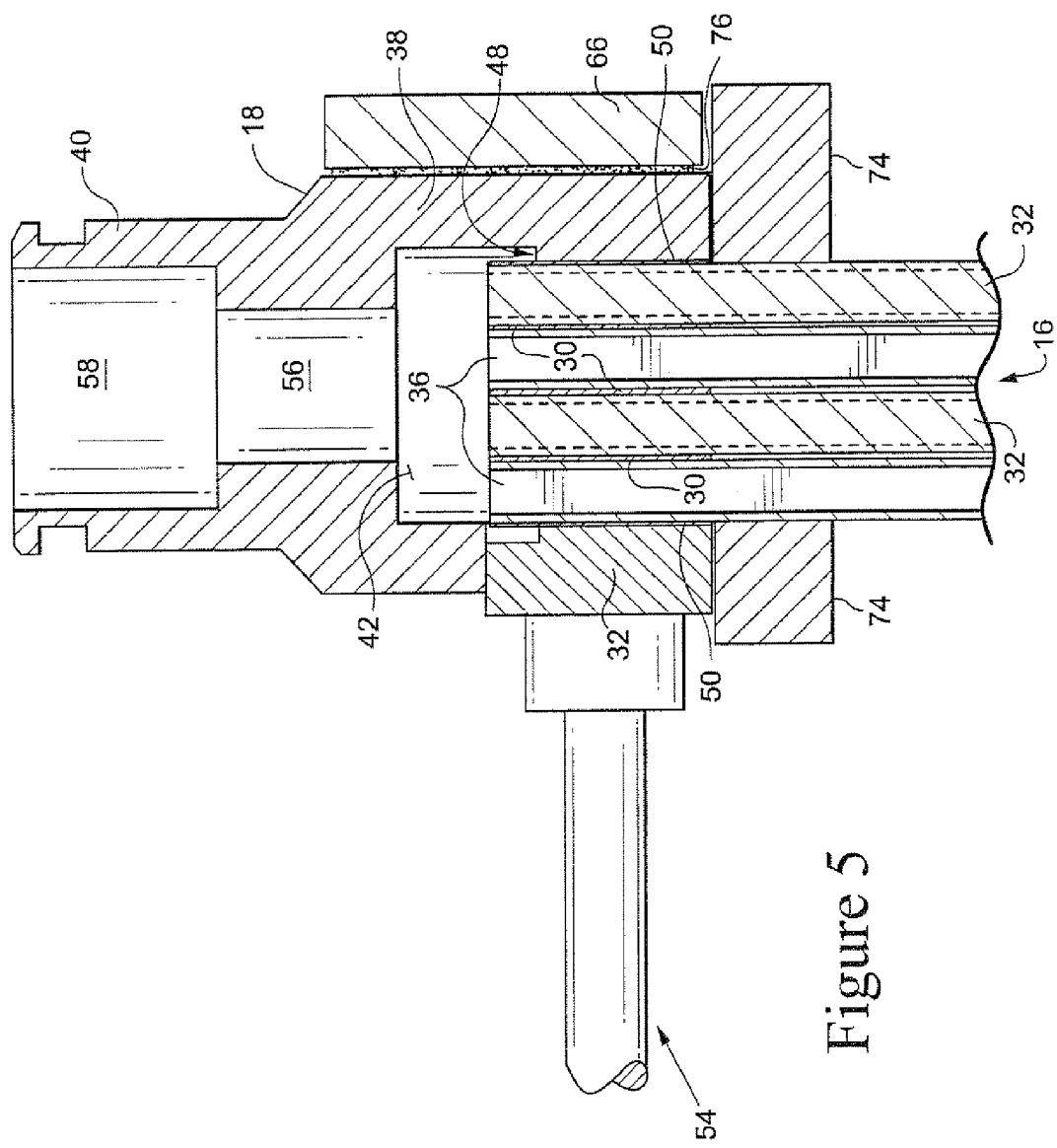
FIG. 5 is a side view of the winding bar, end clip and ram shown in a cross-section taken along line 5-5 in FIG. 4.

FIG. 5 is a cross-sectional side view of a hydraulic header clip 18 receiving an armature winding bar 16 and the ram 54 to press the clip cover 32 into the clip slot 39 during brazing. The solid and hollow copper strands 34, 36 are disposed in a side-by-side and superposed relation one to the other, in a generally rectangular, multi-tier array. The array may be compressed within the hydraulic end fitting or header clip 18 by means of the side cover 32 fitted within a similarly shaped slot 39 of the header clip. Ram 54 presses the clip cover 32 into the collar 38 and compress together the ends of the strands 34, 36 and interleaved braze strips.

The clip is seated in an induction heating coil 66. Mica spacers 76 separate the coil from the clip and the ram 54 from the clip cover. The mica spacer between the coil and clip may be 0.060 inches and the spacer between the ram and clip cover may be 0.030 inches. A cooled heat sink clamp 74 grasps the bar 16 just below the clip during the brazing process.

Each hydraulic header clip 18 includes an internal manifold chamber 42 within the clip collar 38. The manifold chamber 42 receives the strand ends 34, 36 of the armature bar and provides a conduit for coolant flowing through the clip 18 to enter or be discharged from the hollow strands 36 of the armature bar 16. Within the clip, the manifold chamber 42 is internally open to a necked down internal chamber section 56 and to an expanded sub-chamber 58, which is aligned with the hose coupling 40 and configured to receive coolant flowing into or out of a hose. The external and internal shapes of a clip may vary to suit different armature bar configurations that are present in large liquid cooled turbine generators.

When the bar 16 is brazed to the hydraulic header clip 18, the free ends of the solid copper strands 34 are generally flush with a back wall 48 of the manifold chamber 42. The free ends of the hollow copper strands 36 extend partially into the manifold chamber 42. The ends of the hollow copper strands 36 may extend about 10 to 500 thousands of an inch beyond the ends of solid strands 34 and into the chamber 42.

The differential lengths of the solid and hollow strands may be achieved by any suitable means including the use of a cutting tool to shorten the solid strands. The alloy strips 30 between the tiers of the solid and hollow strands do not generally extend axially beyond the ends of the hollow strands 36 so that liquid braze when liquefied does not plug the open ends of the hollow strands. In addition, filler metal 44 and the braze alloy sheets 50 (FIG. 3) are pre-placed along the interior walls 46 of the clip to surround the enclosed ends of the hollow and solid strands. The filler metal 44 may be a copper-silver alloy that is positioned between the outer strands and the interior of the clip.

At the end of the brazing process, a braze alloy isolation layer 52 (FIG. 9) extends axially along and between all sides of each of the strands 34, 36 in the array, and also covers the ends (or faying surfaces) of the solid strands 34 while leaving the ends of the hollow strands 36 open and unobstructed for free flow of coolant through the hollow strands.

Figures 9, 10:
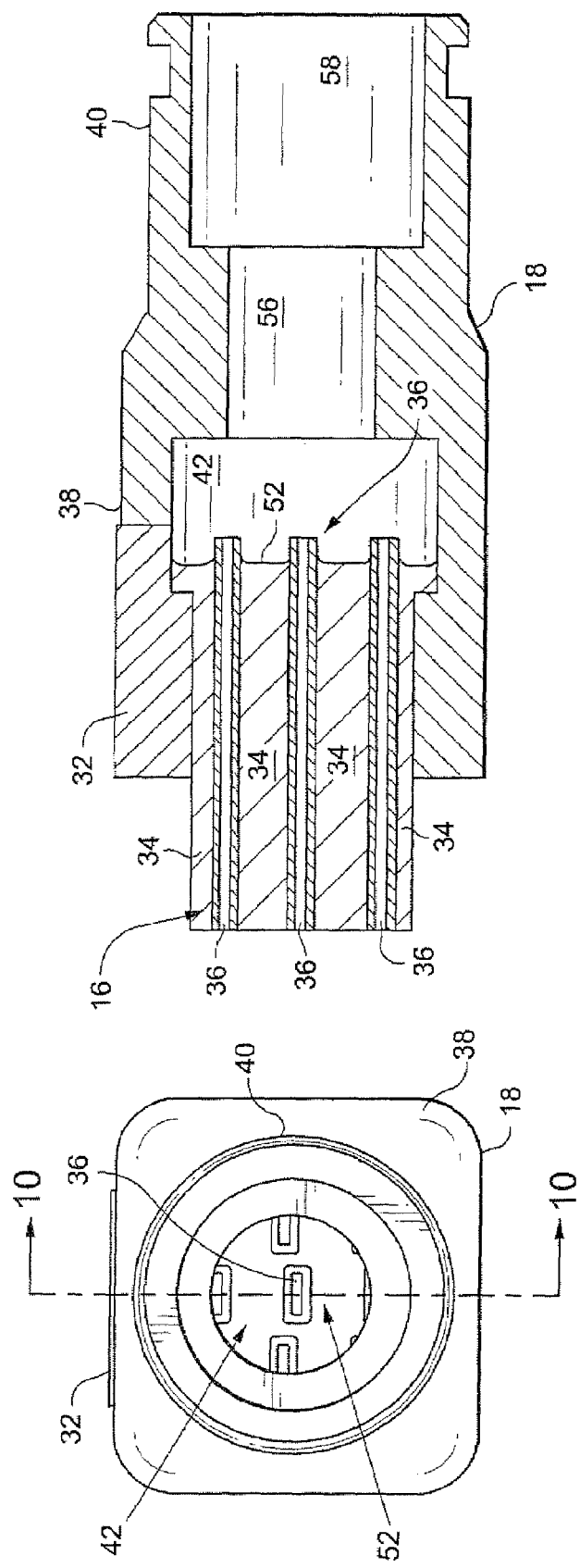
FIGS. 9 and 10 are end and cross-sectional side views respectively of the hydraulic header clip brazed to an armature bar.

The braze joint can be made with the axis of the armature bar in either a horizontal or a vertical orientation. The vertical orientation is preferred because it aids alloy retention in the joint and permits pieces of the alloy to be more easily preplaced on the surface of the assembly inside the hydraulic header clip, thereby providing a source of additional braze alloy and/or filler metal that will melt and flow over the bar 16 end surfaces to create a thicker layer of braze isolation layer 52 (FIG. 9).

Figure 6:
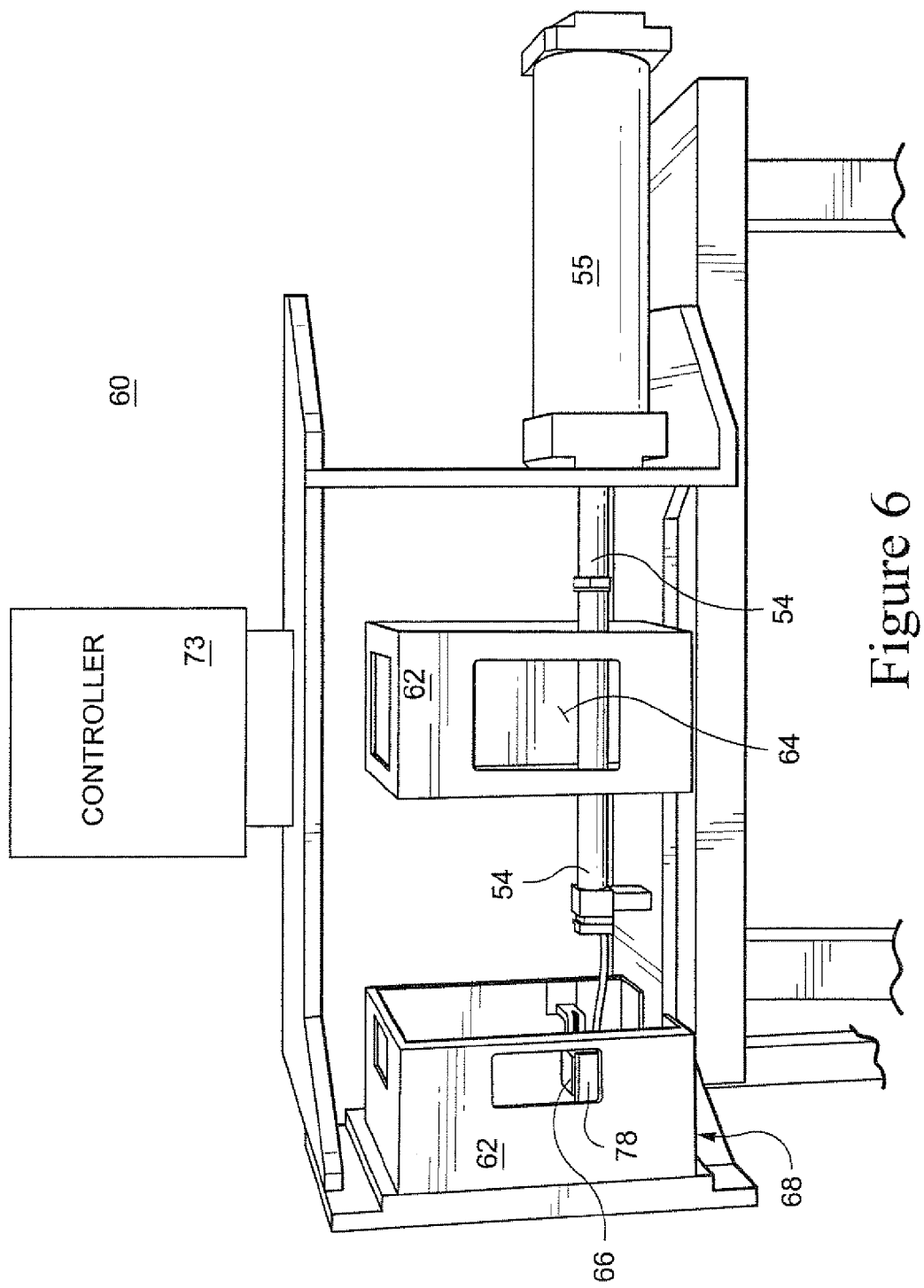
FIG. 6 is a perspective side view of a brazing chamber.

FIG. 6 is a side view of a brazing chamber 60 assembly. The braze chamber 60 is used to form a brazed connection of a liquid-cooled armature bar strand package to the hydraulic header clip 18 with a corrosion resistant braze alloy that is not susceptible to crevice corrosion initiation and provides for an alloy layer at the liquid-cooled interface surface of the brazement.

A split braze chamber has left and right side hood sections 62 that laterally separate to receive the armature winding bar. Once the bar 16 is mounted vertically in the left hood section, the right hood section closes against the left hood to form a closed chamber. Windows 64 in the hood sections allow the braze process to be viewed. The hood can withstand a brazing temperature of 1,000 degrees Celsius (1,832 degrees Fahrenheit) or more.

A controlled gas atmosphere is pumped into the chamber to purge oxygen and form an internal substantially oxygen free atmosphere within the chamber. The controlled gas atmosphere may comprise mixtures of nitrogen and hydrogen or 100 percent hydrogen. After purging, the oxygen level is preferably less than 500 parts per million (ppm) oxygen in the chamber. A substantially oxygen free atmosphere allows the brazing process to proceed without unwanted oxidation of the braze.

Figure 7:
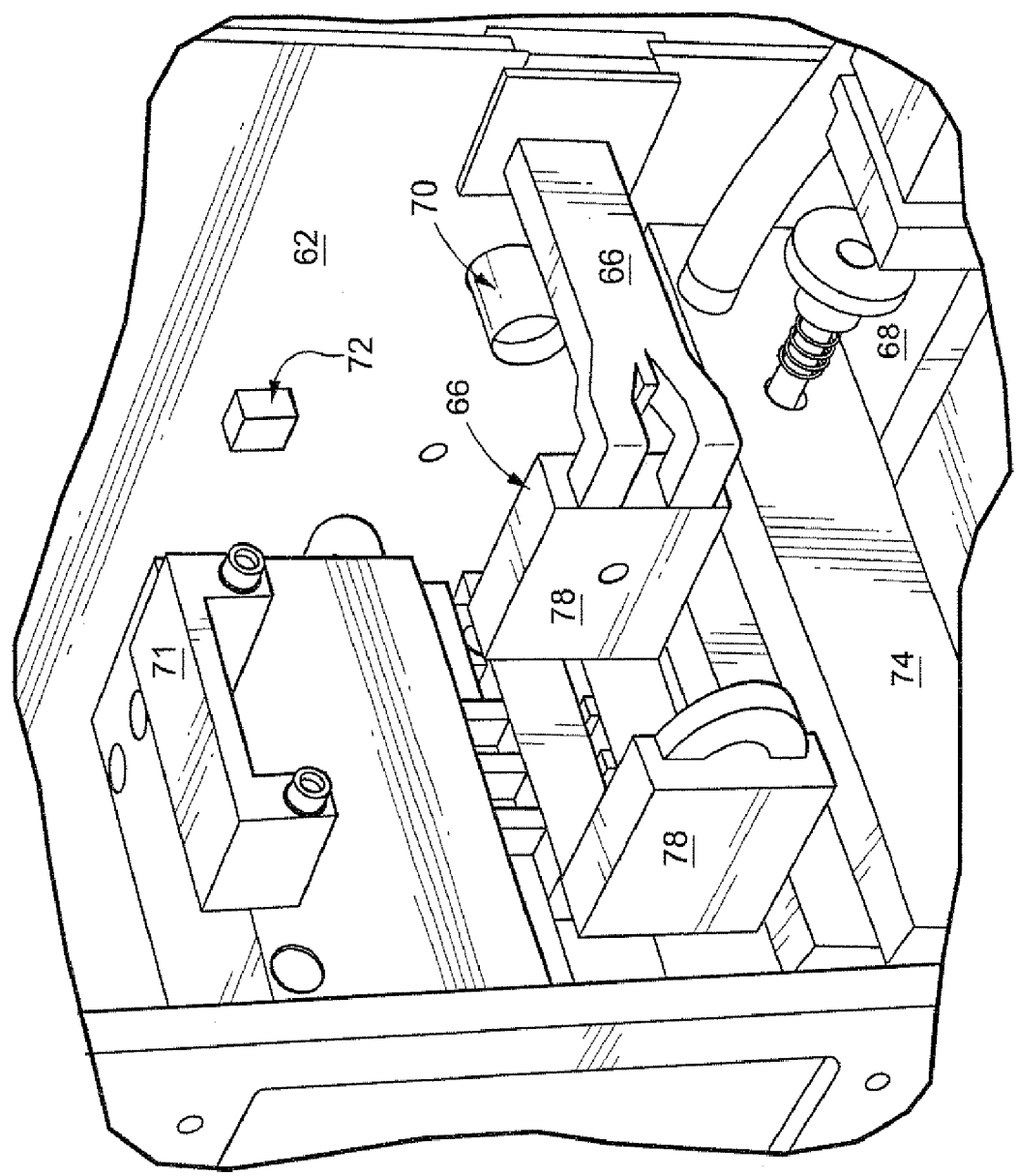
FIG. 7 is an enlarged view of the interior of the brazing chamber that shows an induction heating coil and armature winding bar heat sink.

FIG. 7 is a perspective view of the interior of the left hood 62 of the chamber 60, without an armature bar or clip seated in the coil 66. The induction heating coil 66 heats the clip and bar to a predetermined brazing temperature for a prescribed time period. The temperature profile of the heating coil is a design choice and depends on the brazing process being performed.

A hook-shaped induction heating coil 66 receives the bar end and hydraulic header clip 18. An upper guide 71 aligns the top of the hydraulic header clip such that the collar is between the legs 78 of the induction coil 66. A heat sink clamp 74 secures the armature bar vertically within the braze chamber and prevents liquid braze from flowing down between the strands of the bar. The ram 54 presses the clip cover 32 and strand ends 34, 36 into the clip during the braze process. A pneumatic drive cylinder 55 moves the ram and applies a compressive force to the clip cover.

The bottom wall 68 of the chamber includes a seal to receive the armature bar and prevent leakage of the gas atmosphere in the chamber. The inert gases in the chamber may be maintained at an above-atmospheric pressure to ensure that oxygen does not leak into the chamber.

Multiple temperature indicators 70 in the chamber and are located at various positions inside the brazing chamber. An oxygen sensor 72 within the chamber generates a signal in real time of the oxygen level in parts per million in the chamber atmosphere. The oxygen signal may be provided to a programmable logic controller 73 for the brazing process.

The programmable logic controller (PLC) 73 automates the braze process protocol. The PLC controls the induction coil and monitors the temperature and oxygen level in the chamber during the brazing process. The PLC may also control the force applied by the ram 54, 55 and the linear movement of the ram. The control program executed by the PLC may include multiple time and temperature cycles for heating the coil and the clip and armature bar assembly.

The heat sink 74 is a straight bar clamp that is spring loaded and grasps the bar 16 just below the clip. The heat sink is water cooled to ensure that the armature winding bar 16 below the clip is cooler than the liquidus temperature of the braze alloy. The cool armature bar at the clamp point causes liquid braze alloy flowing down between the bar strands to solidify.

Figure 8:
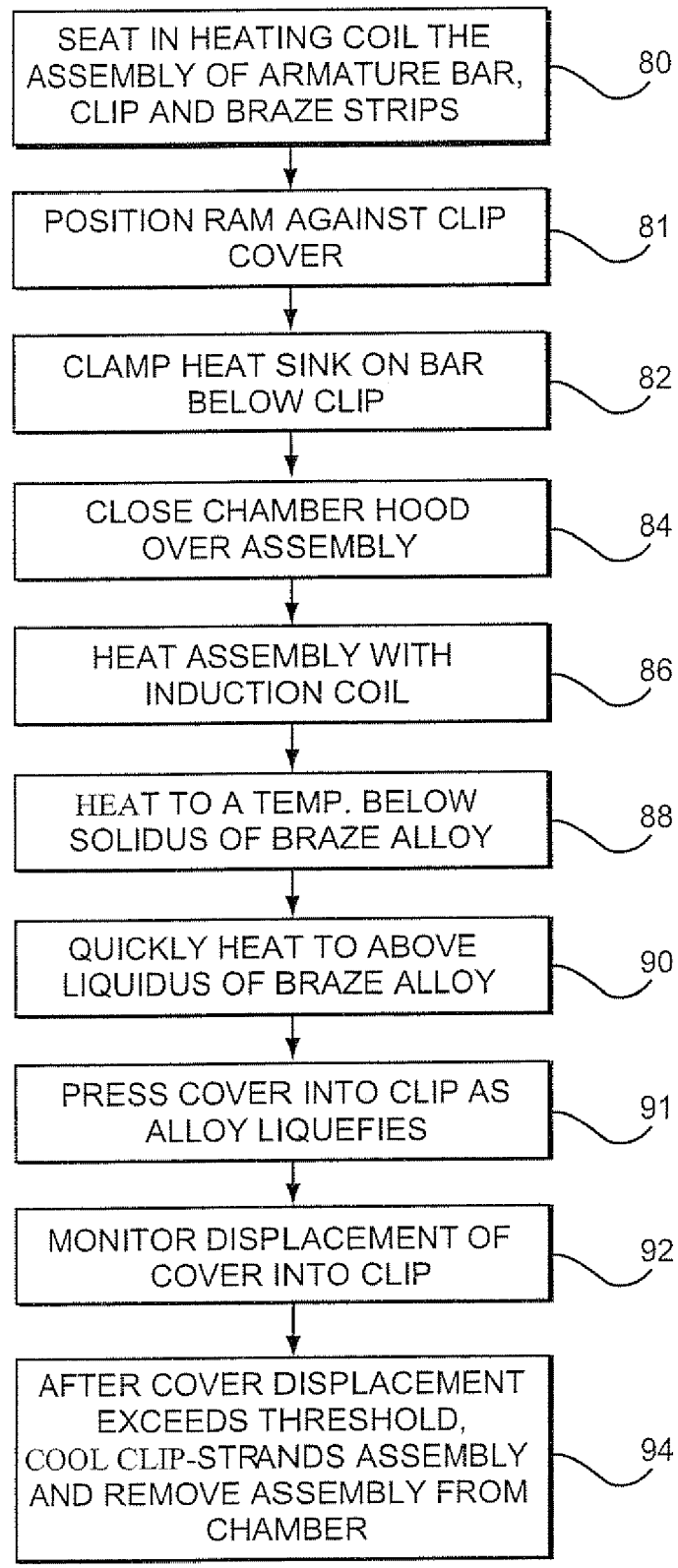
FIG. 8 is a flow chart of an exemplary braze process.

FIG. 8 is a flow chart of exemplary steps for brazing. In step 80, the armature bar 16 and clip 18 assembly is seated in the induction heating coil. Mica insulation sheets 76 may separate the clip from the induction coil. In step 81, ram 54 is positioned against the cover 32 of the clip to force the cover and bar into the clip. The armature bar is mounted vertically such that the free ends of the solid strands 34 are horizontal during the brazing process. An upper stop guide 71 in the left hood (FIG. 7) provides an alignment stop for the free end of the clip. In general, the clip and bar are seated such that the legs 78 of the induction coil 66 are in the same plane as are the extended free ends of the hollow strands 36. In step 82, a heat sink, e.g., a cooled bar clamp, is applied to the armature winding bar 16 at a location below the clip 18. The heat sink cools the armature bar below the clip to prevent liquid braze alloy from flowing down between the bar strands.

In step 84, the hood sections 62 of the braze chamber 60 are closed. The closed chamber is purged to an oxygen free atmosphere, such as less than 500 parts per million of oxygen. The control gas may be a mixture of hydrogen and nitrogen, or alternatively be 100% hydrogen or have some other composition that allows for a good braze joint.

In step 86, the clip is heated by the induction coil to: braze the strand ends together, braze the clip to the strands, and to form a isolation layer 44 (FIG. 9) over the solid ends of the clip. To reduce liquation of the braze alloy, the braze assembly is held at a temperature just below solidus of the braze alloy to allow equalization of temperature within the braze chamber for a period of, for example, 30 to 600 seconds, in step 88. Thereafter, the power applied to the induction coil 66 is increased to quickly raise the temperature to above the liquidus temperature of the braze allow but below the maximum allowable braze temperature for the specific alloy, during step 90. This higher temperature is held for a period of, for example, 5 to 100 seconds. At the higher temperature the braze alloy bonds to the strands and to the clip. In addition, at the higher temperature the braze alloy strips extending beyond the solid strands melts and pools on the ends of the solid strands.

At the higher temperature, the assembly of clip, strands and braze alloy softens and partially liquefied. The ram 54 pressing against the clip cover 32 causes the cover to slid further into the slot 39 of the clip, in step 91. The hold time above the liquidus temperature may be controlled by the amount of displacement experienced by the clip cover. When the desired displacement is met, the braze cycle is terminated. Accordingly, the controller 73 monitors the displacement of the ram against the cover in step 92. The controller terminates the high temperature induced by the coil when the ram displacement exceeds a predetermined level, e.g., up to 0.25 inch, in step 94. The volume and placement of the alloy force applied by the ram to the clip cover, and the temperature profile in the chamber may be controlled by the PLC controller 73 and selected to assist the capillary flow of the liquid braze alloy between the strands and create the desired layer 52 on the ends of the solid strands and between the extended hollow strands.

To control the alloy flow at liquidus within the hydraulic header clip, the clip to cover clearance may preferably be between 0.001 to 0.005 inch between mating surfaces. The liquid cooled heat sink 74 adjacent to the clip on the strands also controls liquid alloy flow by solidifying the braze alloy below the clip. To allow proper alloy flow between the strands, a faying surface allowance of preferably between 0.001 and 0.010 inch is used and a braze assembly force preferably of 100 to 1,800 pounds of force is applied by the ram 54 to the assembly during the braze operation.

During heating to above liquidus temperature (step 90), the liquid braze alloy pools on top of the ends of the solid strands. The pooled alloy forms a corrosion-resistant isolation layer 52 on the end of the armature winding bar. In addition to the braze strips and sheets between adjacent strands and between the strands and the clip, braze material, e.g., braze rods or strips, may be prepositioned on the ends of the solid strands or may be added during the braze process to ensure sufficient braze material pools on the end of the solid strands.

When heated to its melting temperature, the braze alloy flows and fills in the spaces between the solid and hollow strands 34, 36 and between the strands and the interior surfaces of the header clip, including at the opening of the header clip into which the strands are inserted. At its melting temperature, the alloy remains sufficiently viscous that it does not flow substantially to the free ends of the hollow strands. The extended length of the hollow strands 36 provides a safety margin in that the excess alloy material does not flow out as far as the ends of the hollow strands, precluding the possibility of plugging the cooling passages in the hollow strands.

The layer 52 has sufficient thickness and quality to fill the area between the extended hollow strands and over the ends of the short solid strands. Capillary flow draws the liquid braze alloy into the faying surfaces between the strands and between the strands and manifold chamber 42 of the clip. The layer 52 produces a corrosion resistant isolation layer on the water inlet end surface of the armature winding bar. The isolation layer seals the liquid-cooled stator armature bar strands to the hydraulic header clip.

The brazed clip and strands remain in the control atmosphere of the hood until the temperature decreases to a temperature below which no appreciable oxidation forms on the metal surfaces. Thereafter, the hood sections are separated and the armature bar and clip assembly is removed from the braze chamber.

FIGS. 9 and 10 are end and cross-sectional side views respectively of the hydraulic header clip brazed to an armature bar. The hollow 36 and solid 34 end strands are brazed to the collar 38 of the clip 18 such that the free ends of the hollow strands are open to the manifold chamber 42. A braze alloy isolation layer 44 has formed over the free ends of the solid strands 34 and in the crevices between the strands and between the strands and internal surfaces of the manifold chamber of the clip 18. The minimum thickness of the braze alloy isolation layer 44 may be at least 0.050 of an inch.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A system for forming a brazed joint between an armature winding bar and a hydraulic header clip comprising:
    an assembly of free ends of hollow strands and solid strands of the armature winding bar positioned within the hydraulic header clip;
    a silver based braze alloy interleaved between the strands, wherein a portion of the braze alloy extends axially beyond the free ends of a plurality of the solid strands and the free ends of a plurality of the hollow strands extend axially beyond the braze material;

said assembly of the free ends, hydraulic header clip and the braze alloy mounted in a braze chamber, such that the clip is seated in an induction heating coil of the chamber, and a controller receiving a temperature feedback signal from a temperature sensor in the chamber and controlling a temperature in the chamber by controlling power applied to the coil and based on the feedback signal, wherein during a brazing period said coil heats the assembly to a temperature above the liquidus temperature of the braze alloy.

2. The system of claim 1 wherein the coil first heats the assembly to a temperature below a solidus temperature of the braze alloy and within a 200 degrees Fahrenheit of the solidus temperature.

3. The system of claim 1 wherein an atmosphere in the chamber is substantially nitrogen and hydrogen during the brazing period.

4. The system of claim 3 wherein the atmosphere has an oxygen level of less than 400 parts per million.

5. The system of claim 1 further comprising a ram arranged to applying a force to the clip during the braze period.

6. The system of claim 5 wherein the ram applies a force to a side cover of the clip and a clip cover is juxtaposed against the armature bar.

7. The system of claim 5 wherein the force is in a range of 100 to 1,800 pounds.

8. The system of claim 1 further comprising a heat sink applied to a portion of the armature bar in the chamber and axially below the hydraulic header clip.

9. The system of claim 1 wherein the braze chamber is adapted to provide a substantially oxygen free atmosphere for brazing.

10. The system of claim 9 wherein the substantially oxygen free atmosphere is substantially nitrogen and hydrogen.

11. The system of claim 9 wherein the oxygen free atmosphere is substantially all hydrogen.

12. The system of claim 9 wherein the substantially oxygen free atmosphere has an oxygen level of less than 400 parts per million.

13. The system of claim 1 wherein said armature bar is positioned vertically in the chamber.

14. The system of claim 1 wherein the bar comprises solid strands and hollow strands having free hollow ends extending axially beyond solid free ends of said solid strands.

15. The system of claim 1 wherein the braze alloy is positioned axially beyond the solid free ends and no further than the hollow free ends.

16. The system of claim 1 wherein said braze material comprises strips of a silver based braze alloy interleaved between the strands.

17. The system of claim 1 further comprising a heat sink applied to a portion of the armature bar in the chamber and axially beyond the hydraulic header clip while the clip is heated.

* * * * *